UNITED STATES PATENT OFFICE.

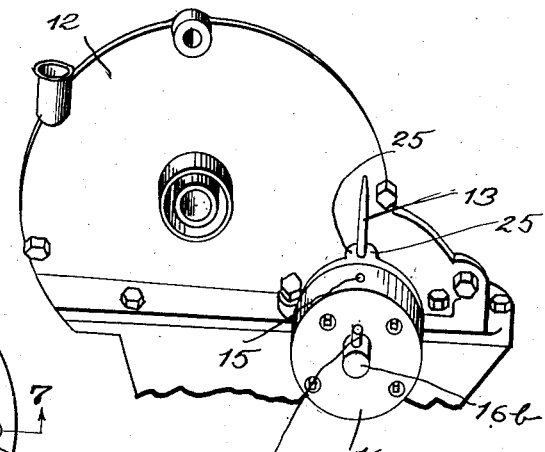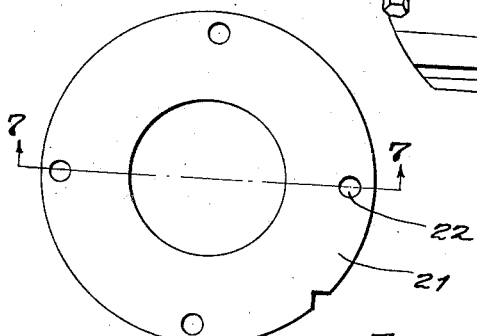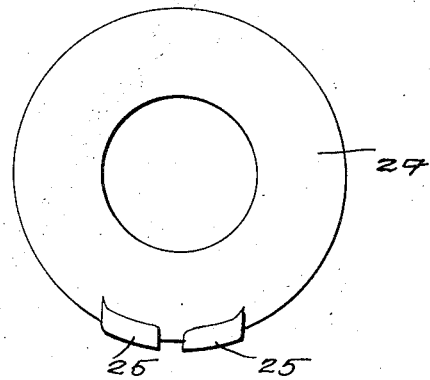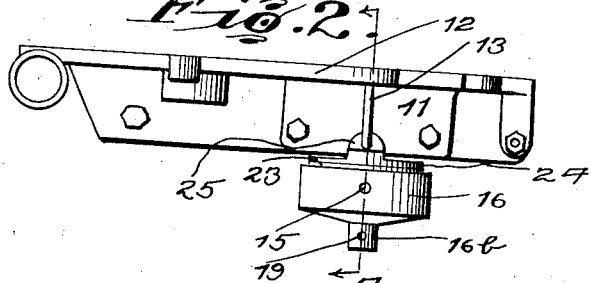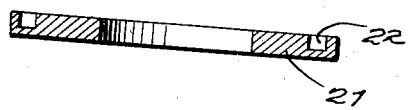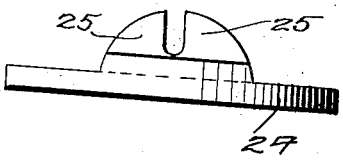

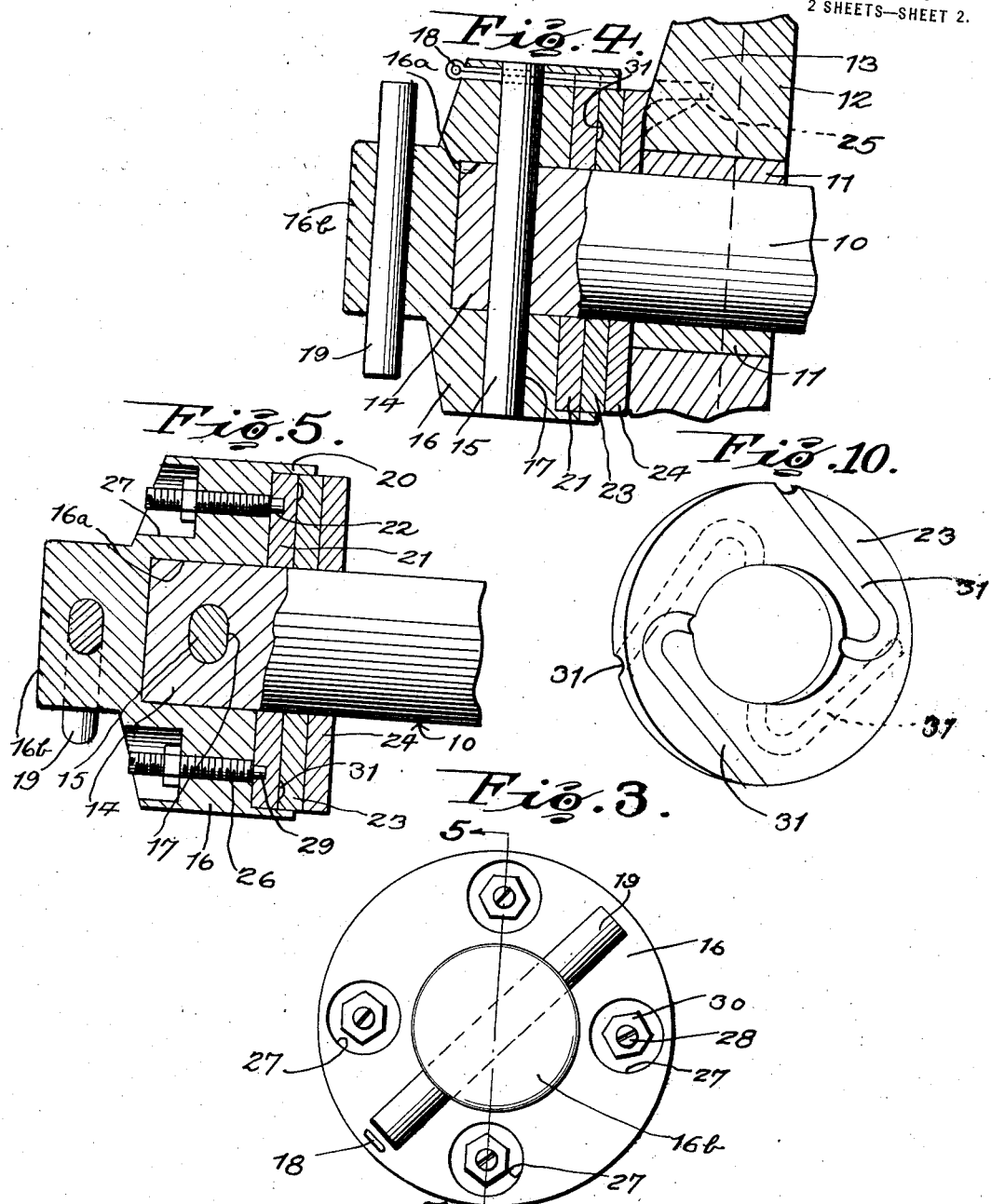

FRANK W. BELK AND ANDREW ELIAS VARNER, OF OXFORD, MISSISSIPPI.

THRUST-TAKE-UP DEVICE.

1,384,227.

Specification of Letters Patent.   Patented July 12, 1921.

Application filed January 19, 1921.   Serial No. 438,463.

*To all whom it may concern:*

Be it known that we, FRANK W. BELK and ANDREW ELIAS VARNER, citizens of the United States, residing at Oxford, in the county of Lafayette and State of Mississippi, have invented certain new and useful Improvements in Thrust-Take-Up Devices, of which the following is a specification, reference being had to the accompanying drawings.

This invention relates to improvements in thrust take-up devices for the crank shafts of internal combustion engines, and more particularly to a device of this character adapted for employment upon the crank shaft of internal combustion engines of the type at present used in the Ford automobile.

An important object of the invention is to eliminate the objectionable results of the end thrust of the crank shaft which, in the type of engine above identified, is a source of considerable annoyance and difficulty in both the operation of the engine and of the lights of the automobile in which the engine is employed.

This is due to the fact that in the construction of these engines the generator embodies portions which are carried by the engine body and base and other parts which are carried by the crank shaft. Accordingly, when wear develops due to the thrust these portions of the generator are separated, resulting in a reduction of the E. M. F. delivered by the generator. This in turn results in difficulty in starting the engine power, missing during the operation of the engine and flickering and often failure of the lights.

A further object of the invention is to provide a device of the above character which may be quickly and easily installed and which may be adjusted to take up subsequent wear without its removal from the crank shaft.

Other objects and advantages of the invention will become apparent throughout the course of the following description:

In the accompanying drawings we have not illustrated the generator and its associated mechanism since these portions of the power plant form no part of the invention, but have simply shown those portions of the power plant contiguous to our thrust bearing and with which our bearing coacts.

In these drawings:—

Figure 1 is a fragmentary perspective of the front end of an engine showing our thrust take up applied thereto;

Fig. 2 is a plan view thereof;

Fig. 3 is a front elevation of the thrust take up device;

Fig. 4 is a section on the line 4—4 of Fig. 2;

Fig. 5 is a section on the line 5—5 of Fig. 3;

Fig. 6 is a front elevation of the pulley engaging plate;

Fig. 7 is a section on the line 7—7 thereof;

Fig. 8 is a rear elevation of the bearing engaging plate;

Fig. 9 is a top plan view thereof, and

Fig. 10 is a perspective of the interposed or anti-friction plate.

Referring now more particularly to the drawings, the numeral 10 indicates the crank shaft of an internal combustion engine which is supported adjacent its forward end by a bearing 11 carried by the engine. The portion of the bearing 11 is usually a portion of a cover plate 12 forming a housing for the timing gearing of the engine, the timing gearing not being herein shown. This cover plate 12 has usually formed thereon a strengthening rib or flange 13 which extends upwardly in a vertical direction from the center of the portion of the cover plate forming the bearing.

The forward end of the shaft projects beyond the forward end of the bearing, as at 14, and is generally provided adjacent its outer end with a transversely extending pin 15 which, in the usual construction, forms a starting pin for the engine and likewise forms a retaining means for the fan belt pulley. In accordance with our invention, we provide a fan belt pulley 16 of a slightly modified construction as will hereinafter appear, the pulley being provided with a socket 16ª receiving the end of the shaft and with a diametrically extending opening 17 through which the pin 15 extends. The pulley is further provided with a transversely extending opening receiving a cotter pin 18 which extends through the pin 15 and prevents displacement of the same. The outer surface of the pulley 16 is adapted for the reception of the fan belt, as is usual and the forward face of the pulley is provided with an axial extension 16ᵇ through which extends a pin 19 forming a starting pin.

The rear face of the pulley 16 is provided with a rearwardly extending marginal flange 20 forming a housing within which is received a steel plate 21 having a plurality of circumferentially spaced sockets 22 formed in the forward face thereof for a purpose presently to appear. The rear face of the steel plate 21 is abutted by the plate 23 of approximately the same diameter and formed of some suitable anti-friction material, such as bearing bronze, babbitt or the like. The rear face of the plate 23 is in turn abutted by the steel plate 24 having formed upon its rear face, at the upper edge thereof, spaced, rearwardly extending ears 25 affording therebetween a notch receiving the flange 13 of the plate 12. It will be seen that the plate 24 is held by the ears 25 against rotation and that, accordingly, no friction is applied against the forward end of the bearing 11 of the shaft 10 which would tend to cause undue wear thereon.

The pulley 16 has formed therethrough a plurality of screw threaded openings 26 corresponding in number and arrangement to the sockets 22 of the plate 21, each of the openings 26 having their forward ends counter-sunk, as at 27. These screw threaded openings are adapted for the reception of adjusting screws 28 which extend through the threaded bores 26 and have their inner ends reduced, as at 29, for engagement in the sockets 22 of the plate 21. It will be seen that by adjusting the screws 28, the spacing of the plate 21 from the rear face of the pulley 16 may be variably altered, as desired. Since this plate contacts the plates 23 and the plate 23 in turn contacts the plate 24 abutting the end of the bearing 11, it will be seen that the shaft 10 may be drawn forwardly in its bearing by adjustment of these screws. When the desired adjustment has been secured, the adjusting screws 28 may be locked against movement by means of lock nuts 30, which are preferably set within the recesses formed by counter-sinking the ends of the threaded bores 26 in order that they may not be exposed beyond the surface of the pulley. The plate 23 is preferably provided with grooves 31 by means of which lubrication may be supplied thereto, these grooves being provided in each of its faces.

From the foregoing it will be obvious that we have constructed a thrust bearing for use with internal combustion engines which is particularly well adapted for the purpose for which it is intended by reason of the fact that positioning thereof may be variably adjusted when desired to take upon any further loosening caused by wear. It will likewise be obvious that many changes in the construction as hereinbefore set forth are possible without in any manner departing from the spirit of our invention; and we, accordingly, do not limit ourselves to such specific structure except as hereinafter claimed.

What we claim is:

1. In a thrust take-up for the crank shafts of internal combustion engines, a member secured to the crank shaft forwardly of the front end bearing thereof, a stationary plate surrounding the shaft and abutting the forward end of the front end bearing, a second plate surrounding the shaft adjacent the rear face of a member and provided in its forward face with sockets, an anti-friction device disposed intermediate said plates, adjusting screws extending through said member and having their rear ends engaged in the sockets of the second plate and thereby holding said second plate against rotation with relation to the member.

2. In a thrust take-up for the crank shafts of internal combustion engines embodying the usual front end bearing for the crank shaft, a strengthening rib extending upwardly from the center portion of the bearing, a member secured to the crank shaft at the forward end of the front end bearing thereof, a plate surrounding the shaft and abutting the forward end of the front end bearing, rearwardly extending ears formed on said plate and engaging the opposite sides of said flange whereby to prevent rotation of said plate, a second plate surrounding the shaft adjacent the rear face of the member, an anti-friction device disposed intermediate said plates and means carried by said member for holding said second plate against rotation with relation thereto and for adjusting said second plate longitudinally of the crank shaft.

3. In a thrust take-up for the crank shafts of internal combustion engines, a pulley secured to the crank shaft forwardly of the front end bearing thereof, a stationary plate surrounding the shaft and abutting the forward end of the front end bearing, a second plate surrounding the shaft adjacent the rear face of the pulley, an anti-friction device disposed intermediate said plates, said second plate being provided in the forward face thereof with a plurality of circumferentially spaced sockets, adjusting screws having threaded engagement with the pulley and having the threaded rear ends engaged in the sockets of the second plate and a marginal flange formed on the rear face of said pulley and overhanging the second named plate.

4. The combination with the crank shaft of an internal combustion engine embodying the usual front end bearing for the crank shaft and through which the crank shaft extends, the crank shaft being provided adjacent its forward end with a diametrical opening, of a fan belt pulley having a socket receiving the forward end of the shaft and having diametrical openings formed therein adapted to aline with the opening of said shaft for the reception of a pin, an axial extension formed on the forward face of said pulley, a starting pin carried by said axial extension, an anti-friction bearing disposed intermediate the rear face of said pulley and said bearing and means extending through said pulley and engaging a portion of said anti-friction bearing for adjusting the same longitudinally of the shaft.

In testimony whereof we hereunto affix our signatures.

F. W. BELK.
ANDREW ELIAS VARNER.